(12) United States Patent
Kaufman

(10) Patent No.: US 7,108,823 B2
(45) Date of Patent: Sep. 19, 2006

(54) STAGED COMPRESSION MOLDING PROCESS

(75) Inventor: Brett Kaufman, Newburgh, IN (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 10/947,749

(22) Filed: Sep. 23, 2004

(65) Prior Publication Data

US 2005/0067735 A1    Mar. 31, 2005

Related U.S. Application Data

(60) Provisional application No. 60/505,827, filed on Sep. 25, 2003, provisional application No. 60/534,292, filed on Jan. 5, 2004.

(51) Int. Cl.
*B29C 43/14*   (2006.01)

(52) U.S. Cl. ............. 264/294; 264/320; 264/325

(58) Field of Classification Search ........... 264/245, 264/255, 320, 325, 294, 296, 268, 323
See application file for complete search history.

(56) References Cited

U.S. PATENT DOCUMENTS

| | | | |
|---|---|---|---|
| 4,343,754 A | 8/1982 | Wilde et al. | |
| 4,497,765 A | 2/1985 | Wilde et al. | |
| 4,635,460 A * | 1/1987 | Paunov et al. | 72/259 |
| 4,664,280 A | 5/1987 | Whitney et al. | |
| 4,674,643 A | 6/1987 | Wilde et al. | |
| 4,797,082 A * | 1/1989 | Hughes | 425/356 |
| 4,921,646 A | 5/1990 | Stewart | |
| 5,149,479 A * | 9/1992 | Nakajima | 264/163 |
| 5,642,824 A | 7/1997 | Hess et al. | |
| 5,650,113 A | 7/1997 | Gregory et al. | |
| 5,659,518 A | 8/1997 | McLaury | |
| 5,807,592 A | 9/1998 | Alieri | |
| 6,294,121 B1 | 9/2001 | Hara et al. | |
| 6,321,923 B1 | 11/2001 | Wood | |
| 6,471,902 B1 * | 10/2002 | Snyder | 264/294 |
| 2002/0109267 A1 * | 8/2002 | Herbst | 264/328.7 |
| 2003/0116879 A1 | 6/2003 | Mueller et al. | |
| 2004/0169307 A1 | 9/2004 | Mueller et al. | |

* cited by examiner

*Primary Examiner*—Jill L. Heitbrink
(74) *Attorney, Agent, or Firm*—Barnes & Thornburg LLP

(57) ABSTRACT

A process of molding a container closure comprises depositing a gob of thermoplastics material in a mold cavity and then moving mold plates in an upper mold portion relative to an opposing lower mold portion to form the container closure in the mold cavity.

5 Claims, 6 Drawing Sheets

STAGED COMPRESSION MOLDING PROCESS

This application claims priority under 35 U.S.C. § 119(e) to U.S. Provisional Application Ser. No. 60/505,827, filed Sep. 25, 2003 and U.S. Provisional Application Ser. No. 60/534,292, filed Jan. 5, 2004, which are expressly incorporated by reference herein.

BACKGROUND

The present disclosure relates to compression molding processes. More particularly, the present disclosure relates to compression molding of plastics materials to produce container closures.

Compression molding of plastics materials typically entails forming a portion of raw material into a molded end-product such as a household item, for example. Compression molding methods are used to form thermosetting and thermoplastic resins to produce articles such as closures for containers.

SUMMARY

In accordance with the present disclosure, a process of molding a container closure comprises depositing a gob of thermoplastics material in a mold cavity defined between upper and lower mold portions and then moving mold plates included in the upper mold portion in stages relative to the lower mold portion to form a monolithic container closure in the mold cavity. In illustrative embodiments, three separate mold plates are moved in sequence to apply a low-pressure force to the gob in the mold cavity and then the three mold plates are moved in unison to apply a relatively higher high-pressure force to the gob in the mold cavity. This process produces a monolithic container closure comprising a base adapted to mount on a container, a cap configured to mount on and close a discharge opening formed in the base, and a living hinge interconnecting the cap to the base in an illustrative embodiment.

Features of the process will become apparent to those skilled in the art upon consideration of the following detailed description exemplifying the best mode of the disclosure as presently perceived.

BRIEF DESCRIPTION OF THE DRAWINGS

The detailed description particularly refers to the accompanying Figures in which:

FIG. 4 is a sectional view of the mold of FIG. 3 after deposit of an elongated gob of thermoplastics material into an interior region of the mold;

FIG. 5 is a sectional view of the mold of FIG. 3 showing a first stage of the molding process as low pressure is applied by a first-stage mold plate included in the upper mold portion to a portion of the underlying thermoplastics material to cause the material to begin flowing across the face of the lower mold portion from a first region of a mold cavity provided in the mold into other regions of the mold cavity;

FIG. 6 is a sectional view of the mold of FIG. 3 showing a second stage of the molding process as low pressure is applied by first- and second-stage mold plates included in the upper mold portion to the underlying thermoplastics material to further distribute the material across the face of the lower mold portion and within the mold cavity formed in the mold;

FIG. 7 is a sectional view of the mold of FIG. 3 showing a third stage of the molding process as low pressure is applied simultaneously by first-, second-, and third-stage mold plates included in the upper mold portion to distribute the thermoplastic material fully across the face of the lower mold portion and within the mold cavity;

FIG. 8 is a sectional view of the mold of FIG. 3 showing a fourth and final stage of the molding process wherein high pressure is applied simultaneously by the first-, second-, and third-stage mold plates included in the upper mold portion to enhance physical properties of the monolithic container closure formed in the mold;

FIG. 10 is a sectional view of the mold of FIG. 3 after deposit of another gob of thermoplastics material into a first region of the mold cavity in accordance with another aspect of this disclosure;

FIG. 11 is a sectional view of the mold of FIG. 3 showing a first stage of the molding process as low pressure is applied by a first-stage mold plate to the thermoplastics material to cause the material to begin flowing across the face of the lower mold portion from the first region of the mold cavity into other regions of the mold cavity;

FIG. 12 is a sectional view of the mold of FIG. 3 showing a second stage of the molding process as low pressure is applied by first- and second-stage mold plates to the thermoplastics material to further distribute the material across the face of the lower mold portion and within the mold cavity;

FIG. 14 is a sectional view of the mold of FIG. 3 after deposit of a first gob of thermoplastics material into a first region of the mold cavity and deposit of a second gob of thermoplastics material into a second region of the mold cavity in accordance with another aspect of this disclosure;

FIG. 15 is a sectional view of the mold of FIG. 3 showing a first stage of the molding process as (1) low pressure is applied by one mold plate to the first gob to cause material in the first gob to begin flowing across the face of the lower mold portion from the first region of the mold cavity into other regions of the mold cavity and (2) low pressure is also applied by another mold plate to the second gob to cause material in the second gob to begin flowing across the face of the lower mold portion from the second region of the mold cavity into other regions of the mold cavity; and FIG. 16 is a sectional view of the mold of FIG. 3 showing a second stage of the molding process as low pressure is applied by yet another mold plate to the thermoplastics materials extant in the mold cavity to further distribute the materials across the face of the lower mold portion and within the mold cavity.

DETAILED DESCRIPTION

Figure 3:
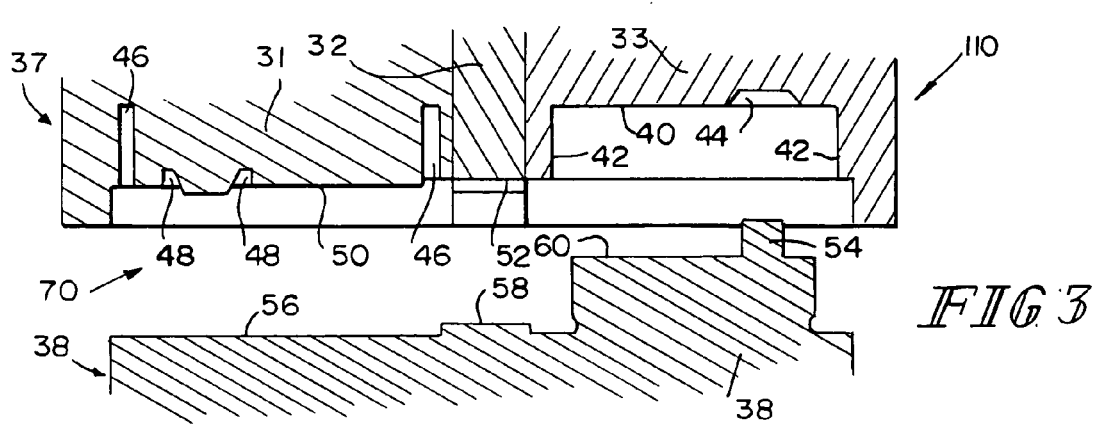
FIG. 3 is a diagrammatic, sectional view of a mold comprising a three-section upper mold portion separated from and arranged to confront an underlying lower mold portion prior to deposit of a "gob" of thermoplastic material into an interior region located between the upper and lower mold portions.
Figure 13:
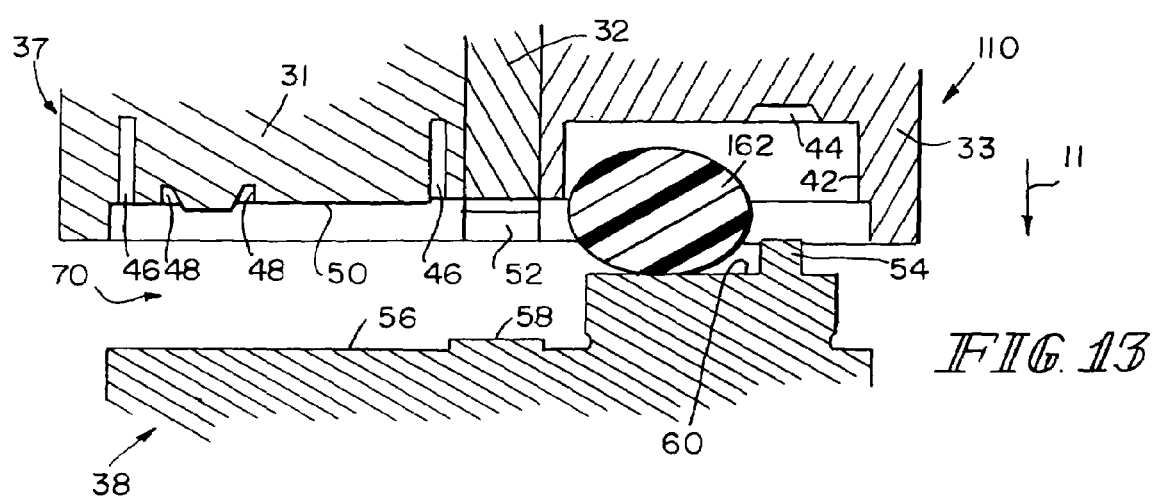
FIG. 13 is a sectional view similar to FIG. 10 showing initial deposit of a gob of thermoplastics material into a second region of the mold cavity in accordance with yet another aspect of the disclosure.

Methods of compression molding a gob 62 or 162 of a thermoplastics material in stages to produce a monolithic article such as a container closure are described in this disclosure. A "staged" compression mold 110 shown in FIG. 3 is used to mold a first gob 62 of a thermoplastics material made in a manner suggested in FIG. 9 in an illustrative sequence shown, for example, in FIGS. 4–8. Mold 110 is also used to mold a second gob 162 of a thermoplastics material placed in a first region of a mold cavity provided in mold 110 in an illustrative sequence shown partly in FIGS. 10–12. Mold 110 is also available to be used to mold second gob 162 when that second gob 162 is placed in a second region of the mold cavity provided in mold 110 in an initial position shown, for example, in FIG. 13. Mold 110 is also available to be used to mold two separate gobs 262, 362 of material placed in separate regions of the mold cavity provided in mold 110 in an illustrative sequence shown partly in FIGS. 14–16.

Figure 1:
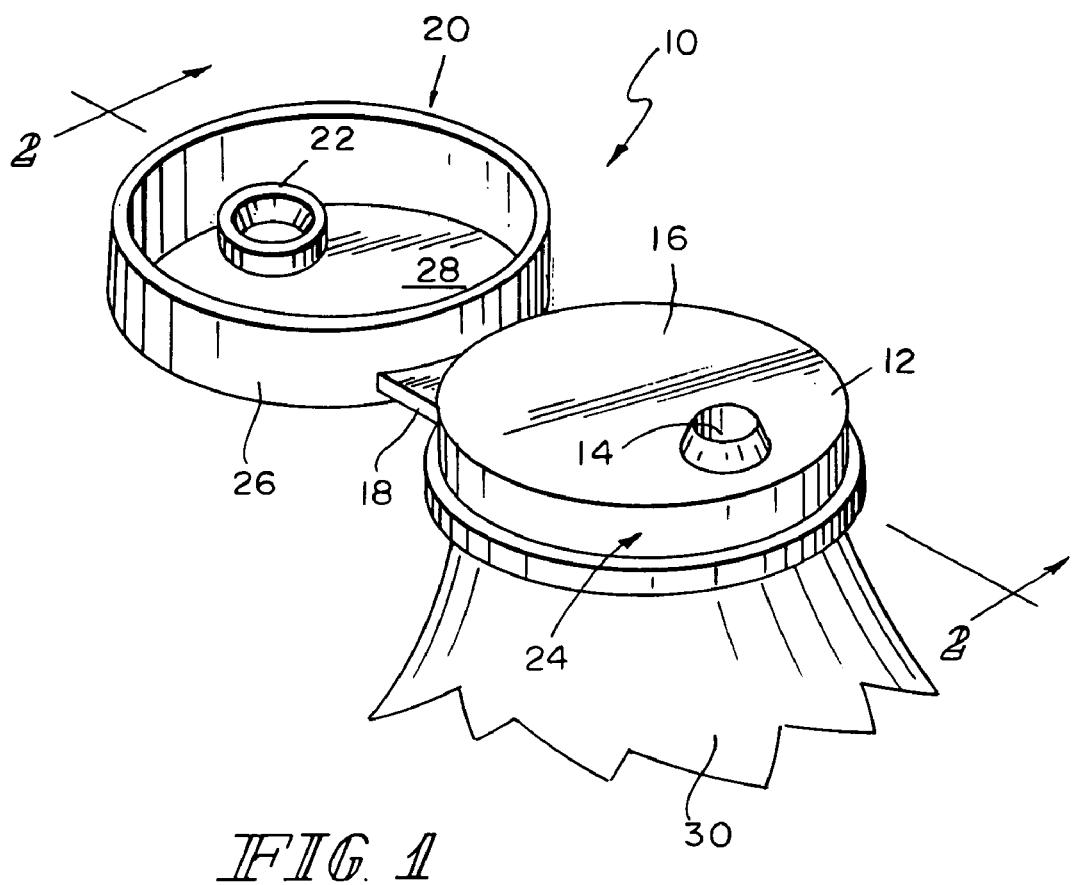
FIG. 1 is perspective view, with portions broken away, of a container carrying a monolithic container closure of the type made of a plastics material and formed by the staged compression molding process disclosed herein.
Figure 2:
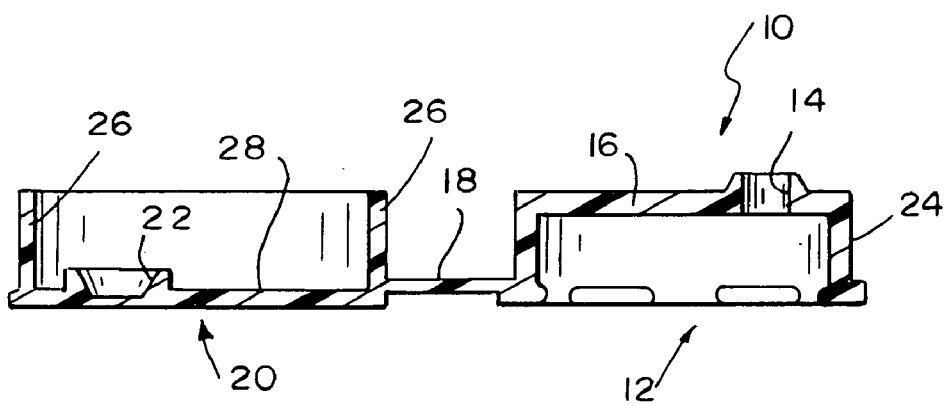
FIG. 2 is a sectional view of the closure of FIG. 1 taken generally along line 2—2 in FIG. 1 showing (from left to right) a lid, hinge, and cap included in the monolithic container closure.

A container closure 10 includes a base 12 adapted to mount on a container 30, a hinge 18, and a cap 20 as shown, for example, in FIGS. 1 and 2. Base 12 is formed to include a discharge aperture 14 in a top wall 16. Cap 20 is formed to include a sealing dome 22 depending from a top wall 28, as shown, for example, in FIGS. 1 and 2. Base 12 includes an annular side wall 24 adapted to be coupled to an annular rim (not shown) of container 30. Cap 20 is adapted to be coupled to base 12 so that discharge aperture 14 is closed and sealed by sealing dome 22 when cap 20 is moved to a closed position (not shown) nesting on and mating with base 12. It is within the scope of this disclosure to vary the shape and geometry of the components which cooperate to effect the seal established at discharge aperture 14.

Closure 10 is monolithic and thus is formed as a single piece of compression-molded material, in three sections, to include base 12, cap 20, and a hinge 18 therebetween, as shown best in FIG. 1. Other shapes and geometries of closure 10 are within the scope of this disclosure. In embodiments in accordance with the molding process illustrated in FIGS. 14–16, a monolithic closure is made using two separate gobs wherein each gob has a selected material and/or color characteristic.

Hinge 18 is coupled to side wall 24 of base 12 and side wall 26 of cap 20 to provide a "living" hinge. Hinge 18 is flexible, allowing tethered movement of cap 20 relative to base 12. Upon completion of the staged compression molding process, base 12 can be of a greater mass than cap 20, which is of a greater mass than hinge 18.

Figure 7:
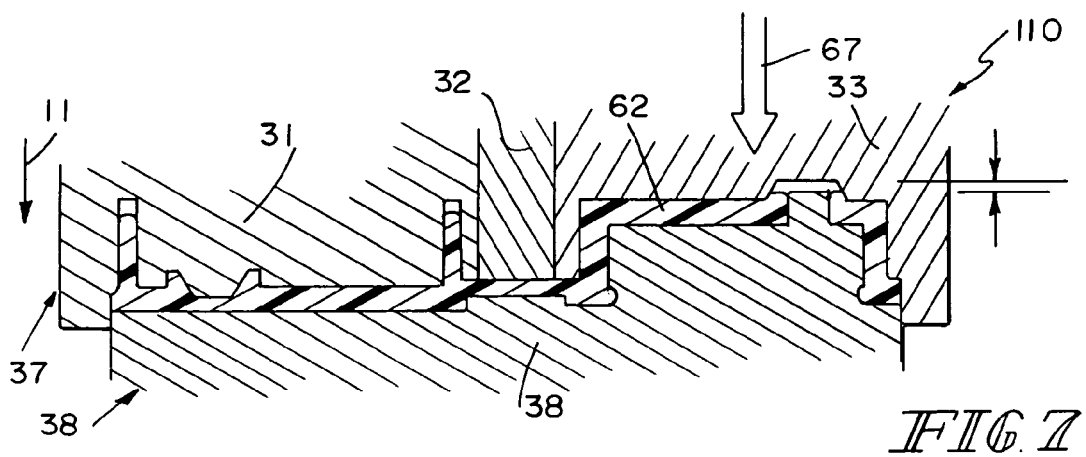
Figure 8:
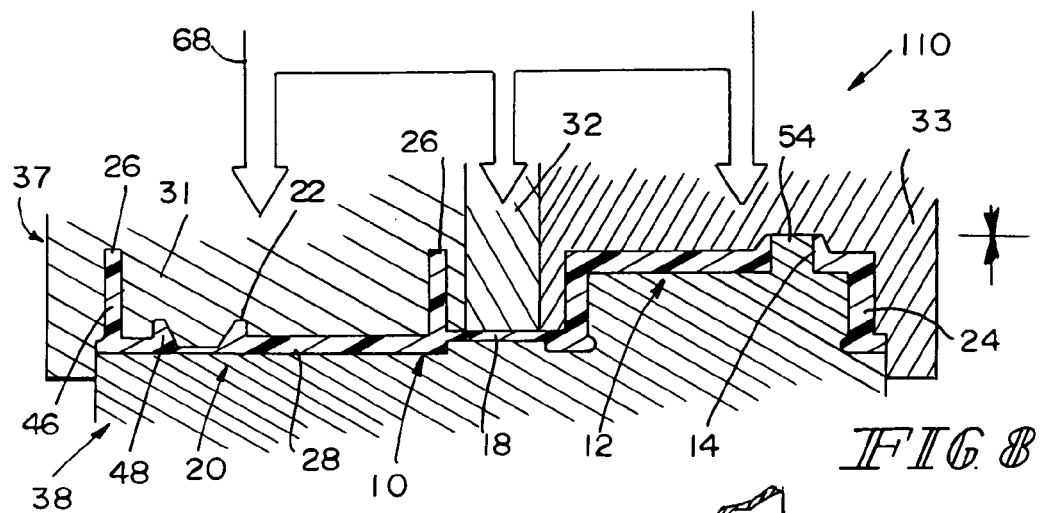
Figure 9:
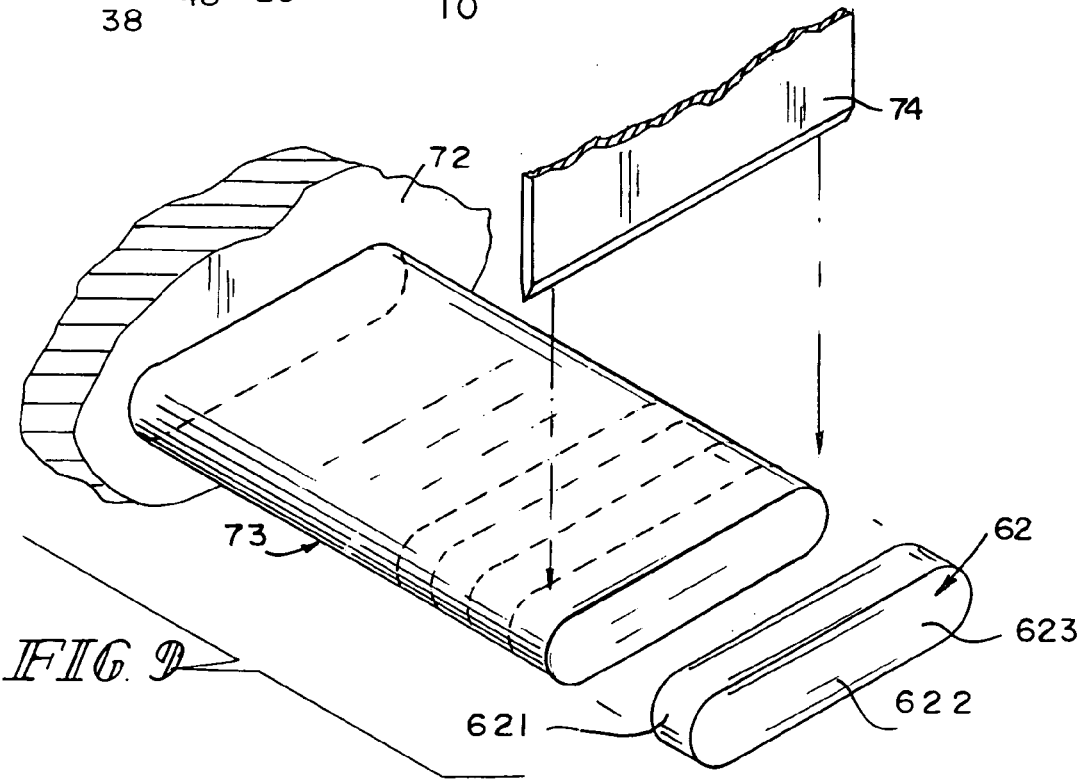
FIG. 9 is a perspective view, with portions broken away, of the elongated gob of FIG. 4 after the gob has been extruded from an extruding device and separated from an extrude discharged from the extruding device.

In one embodiment of the staged compression molding process, a thermoplastics material is extruded from an extruder 72 to provide an extrude 73 and the extrude 73 is cut into a predetermined mass by a cutting instrument 74 to form an elongated gob 62 as suggested in FIG. 9. Gob 62 is then deposited into and arranged to lie in a mold cavity 70 provided in mold 110, as shown, for example, in FIG. 4. A first gob molding sequence is illustrated in FIGS. 4–8 showing various stages of manipulating gob 62 to form container closure 10. Although in the illustrated embodiments, each gob is placed on a "core side" of the mold rather than in the opposing "cavity side" of the mold, it is within the scope of this disclosure to orient the mold so that gobs are placed in the cavity side of the mold before the molding process is initiated.

Mold 110 includes an upper mold portion 37 comprising a first-stage mold plate 31, a second-stage mold plate 32, and a third-stage mold plate 33. Mold 110 also includes a lower mold portion 38 which cooperates with upper mold portion 37 to define an interior region or mold cavity 70 therebetween, as shown, for example, in FIG. 3. Mold plates 31, 32, and 33 are supported to move downwardly in direction 11 and relative to one another to within a predetermined distance of lower mold portion 38 as suggested in FIG. 8 to compress thermoplastics material associated with gob 62 in a mold cavity 70 located between upper and lower mold portions 37, 38 to produce a container closure 10 having a desired shape and thickness.

First-stage mold plate 31 is associated with cap 20 and includes a top wall 50, a dome-forming cavity 48, and a side wall-forming cavity 46. First-stage mold plate 31 is arranged to mate with lower mold portion 38 generally to form cap 20 in the compression molding process by pressing a predetermined thickness of thermoplastics material against lower mold portion 38, as shown, for example, in FIGS. 4 through 8.

Figure 6:
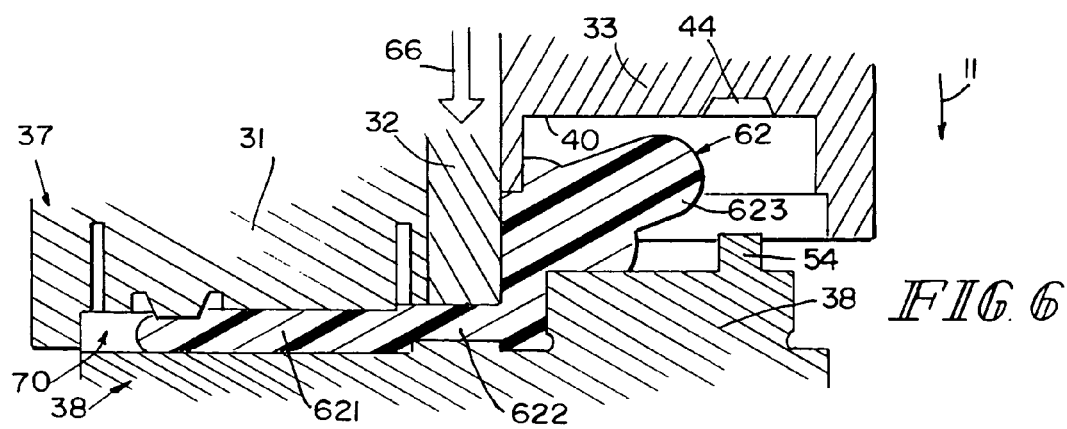

Second-stage mold plate 32 is associated with hinge 18 and includes a top wall 52. Second-stage mold plate 32 is arranged to form hinge 18 in the molding process by pressing a predetermined thickness of thermoplastics material against lower mold portion 38, as shown in FIGS. 6–8. Second-stage mold plate 32 is arranged to lie adjacent to and between first- and third-stage mold plates 31, 33, but is able to move independently of plates 31 and 33. In the illustrated embodiment, second-stage mold plate 32 is contiguous with mold plates 31 and 33.

Third-stage mold plate 33 is associated with base 12 and includes an annular side wall 42, a top wall 40, and a discharge aperture-forming cavity 44 providing an opening in top wall 40. Third-stage mold plate 33 is arranged to mate with lower mold portion 38 to form base 12 in the molding process by pressing a predetermined thickness of thermoplastics material against lower mold portion 38, as illustrated in FIG. 8. Aperture-forming cavity 44 cooperates with plug 54 to form discharge aperture 14 in top wall 16 of base 12.

Based on the geometry of gob 62, a mold in accordance with the present disclosure can be made to work in one stage to distribute the plastics material in the interior region 70 of mold 110, or as in the illustrated process, molding of closure 10 is carried out, for example, in four sequential stages. A cylindrically shaped gob 62 of thermoplastics material is distributed about in interior region 70 of mold 110 during stages one, two, and three of the molding process to fill a mold cavity formed in mold 110 as suggested in FIGS. 4–7. Later, that distributed material is "set" during stage four of the molding process as suggested in FIG. 8.

Figure 4:
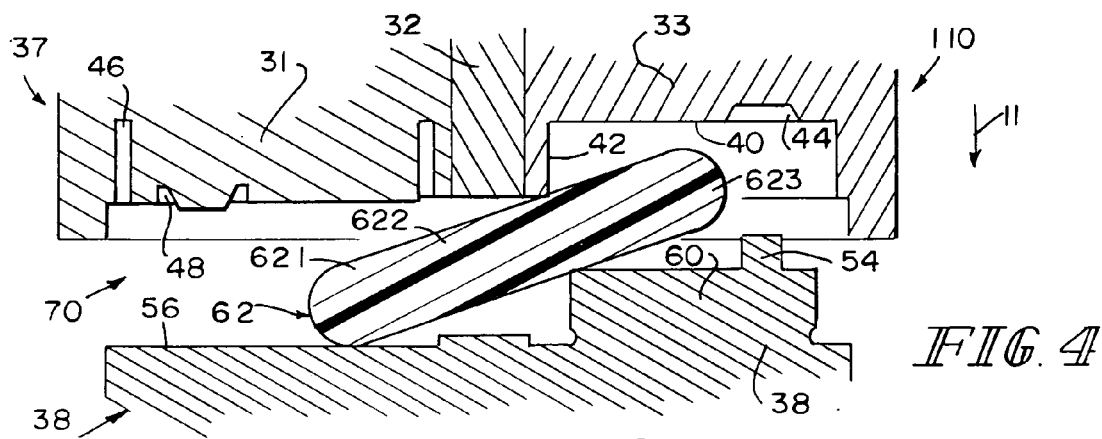
FIGS. 4–8 illustrate a molding sequence in accordance with the present disclosure.

As shown, for example, in FIG. 4, an elongated gob 62 is deposited into mold cavity 70 located between spaced-apart upper and lower portions 37, 38 before the staged molding process in accordance with this disclosure is begun. As shown in FIG. 4, a portion (621, 622) of gob 62 is placed under first-stage and second-stage mold plates 31, 32 and another portion (623) of gob 62 is placed under third-stage mold plate 33 before first-stage mold plate 31 is moved toward first mold bottom face 56 during the first stage of the molding process. In the illustrated embodiment, a first end 621 of gob 62 lies under plate 31, another end 623 of gob 62 lies under plate 33, and a middle portion 622 of gob 62 interconnects ends 621, 623 and lies under plate 32. In the illustrated embodiment, each end 621, 623 of gob 62 has the same shape.

Figure 5:
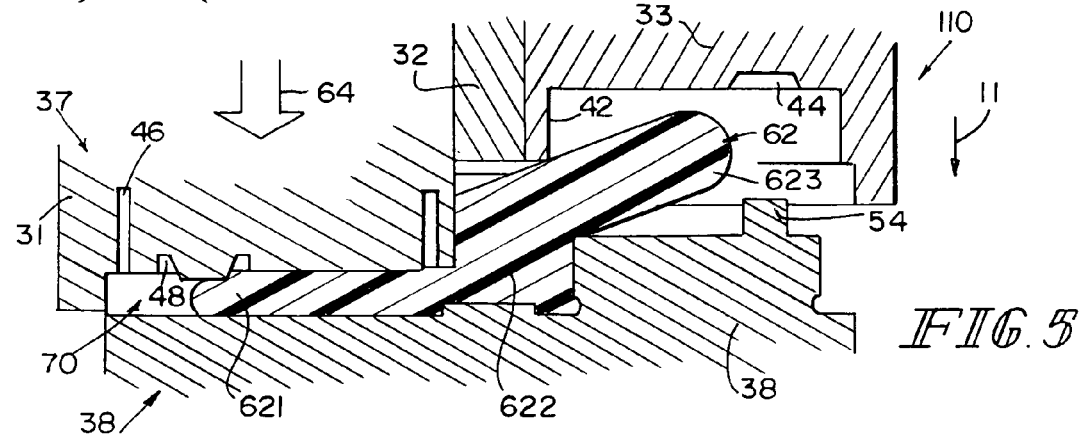

In stage one of the compression molding process, first-stage mold plate 31 is moved in direction 11 to apply a low-pressure force 64, at time ($T_1$), to gob 62 as suggested in FIG. 5. Low-pressure force 64 causes a first portion of gob 62 to be compressed. Compression of gob 62 causes the thermoplastics material to begin flowing across a first mold bottom face 56, a second mold bottom face 58, and a third mold bottom face 60, as can be seen, for example, in FIG. 5.

Stage two of the compression molding process begins at a later time ($T_2$) and begins with an additional low-pressure force 66 being applied to second-stage mold plate 32 as suggested in FIG. 6 to cause plate 32 to move downward in direction 11 relative to and toward lower mold portion 38. Low-pressure force 66 is applied concurrently with low-pressure force 64 to cause a second portion of gob 62 to be compressed so that gob 62 further expands and flows across all of third mold bottom face 60 and lower mold portion 38. Mold 110 is configured as needed to manage flow of gob 62 during movement of plates 31, 32, and 33 toward mold bottom 38 so that plastics material does not "flash over" the top of plug 54 to cover the opening into discharge aperture 14 formed in top wall 16 of closure 10.

At a still later time ($T_3$), stage three of the compression molding process begins with an additional low-pressure force 67 being applied to third-stage mold plate 33 as suggested in FIG. 7 to cause downward movement of third-stage mold plate 33 in direction 11 relative to mold bottom 38. This causes a third portion of gob 62 to be compressed. First-, second-, and third-stage mold plates 31, 32, and 33 are now positioned to lie in confronting spaced-apart relation to, for example, first, second, and third mold bottom faces 56, 58, and 60 of lower mold portion 38 to compress gob 62 therebetween as suggested in FIG. 7.

In an illustrative embodiment, the force applied to gob 62 by each of plates 31, 32, and 33 is relatively low and substantially the same. It is within the scope of this disclosure to vary the magnitude of that force and the relative timing of stages one, two, and three to regulate distribution and flow of gob 62 in mold cavity 70 provided between upper and lower mold portions 37, 38 during the molding process.

At later time ($T_4$), the simultaneous application of low-pressure forces 64, 66, and 67 to distribute material is increased to a high-pressure force 68 applied to plates 31, 32, and 33 to "set" thermoplastics material 62, as illustrated in FIGS. 7 and 8. High-pressure force 68 is greater than low-pressure forces 64, 66, and 67 and causes further compression of the thermoplastics material in mold cavity 70 of mold 110 so that thermoplastics material 62 attains the desired shape of the end-product, as for example, container closure 10 in the illustrative embodiment.

An illustrative compression molding process is illustrated in FIGS. 4–8. As suggested in FIG. 4, elongated gob 62 of thermoplastics material is arranged initially in interior region or mold cavity 70 of mold 110 to cause one end 621 of gob 62 to lie under first-stage mold plate 31, an opposite end 623 of gob 62 to lie under third-stage mold plate 33, and a middle portion 622 of gob 62 to lie under second-stage mold plate 32. During the compression molding process, end 621 of gob 62 is compressed (at low pressure) during the first stage of compression as shown in FIG. 5; end 621 and middle portion 622 of gob 62 are compressed (at low pressure) during a second stage of compression as shown in FIG. 6; and end 621, middle portion 622, and end 623 of gob 62 are compressed (at low pressure) during a third stage of compression as shown in FIG. 7. Finally, all portions 621, 622, 623 of gob 62 are compressed (at high pressure) simultaneously during a fourth stage of compression as shown in FIG. 8.

In the illustrated embodiment, a monolithic container closure 10 is formed in mold cavity upon movement of first-, second-, and third-stage mold plates 31, 32, and 33 of upper mold portion 37 to predetermined positions relative to lower mold portion 38. A first portion of gob 62 is compressed in a cap-forming region of mold cavity 70 between first-stage mold plate 31 and opposing first mold bottom force 56 to define a cap 20 included in container closure 10. A third portion of gob 62 is compressed in a base-forming region of mold cavity 70 between third-stage mold plate 33 and opposing third mold bottom face 60 to define a base 12 included in container closure 10 and adapted to mount on a container 30. A second portion of gob 62 is compressed in a living hinge-forming region of mold cavity 70 between second-stage mold plate 32 and opposing second mold bottom face to define a living hinge 18 arranged to interconnect base 12 and cap 18 to provide monolithic container closure 10.

Figures 10, 11, 12:
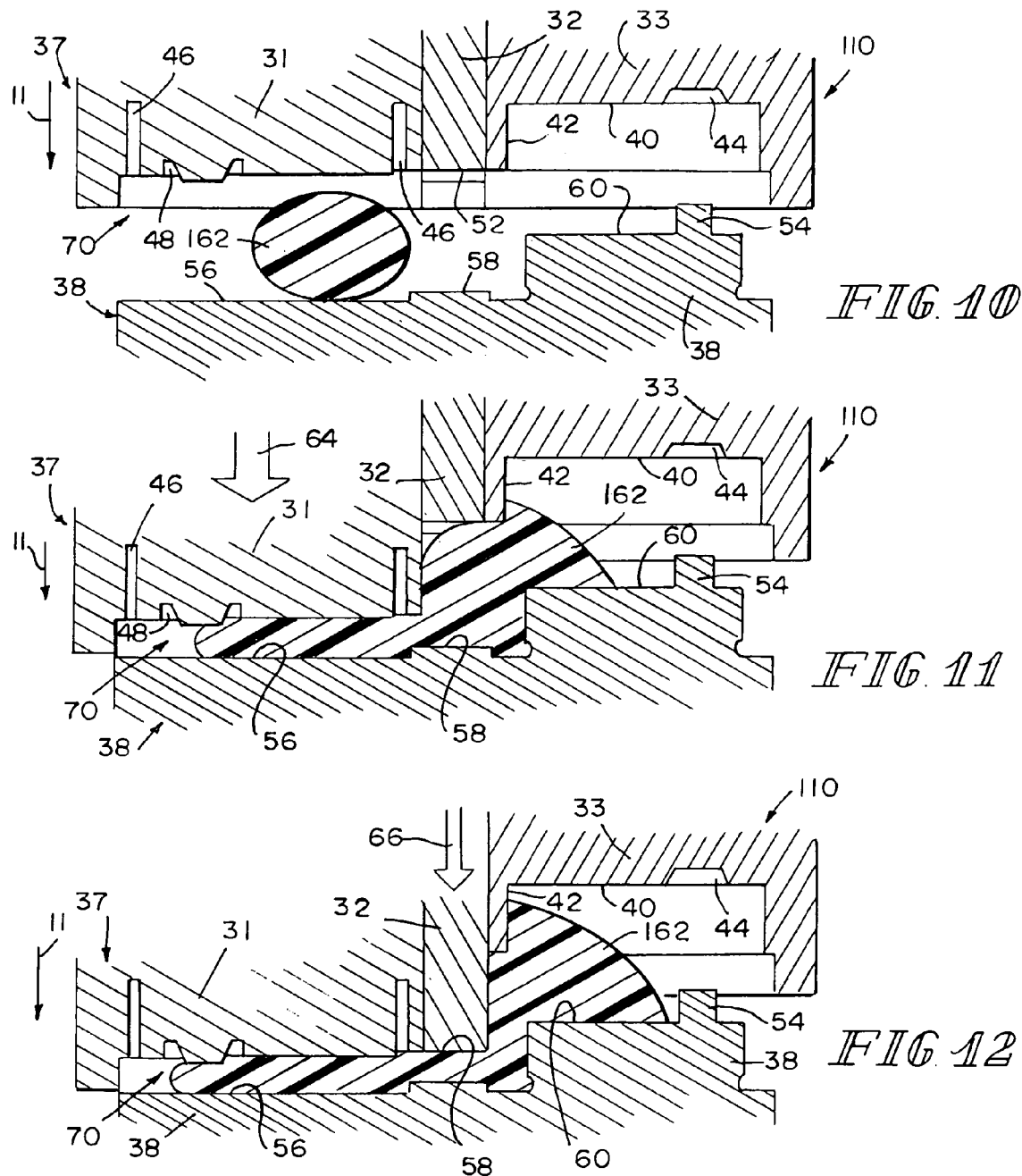
FIGS. 10–12 illustrate another molding sequence in accordance with the present disclosure.

Another illustrative staged compression molding process is illustrated in FIGS. 10–13. As suggested in FIG. 10, a gob 162 of thermoplastics material is arranged in interior region or mold cavity 70 of mold 110 substantially to lie under first-stage mold plate 31. During the compression molding process, some portions of gob 62 are compressed (at low pressure) by first-stage mold plate 31 and other portions flow away from first-stage mold plate 31 to lie under second-stage mold plate 32 and perhaps a portion of third-stage mold plate 33 as shown in FIG. 11. Then, some portions of gob 62 are compressed (at low pressure) by first-stage mold plate 31 and second-stage mold plate 32 (at low pressure) and other portions flow away from plates 31 and 32 to lie under a greater portion of third-stage mold plate 33 as shown in FIG. 12. Further molding of gob 62 to produce container closure 10 is carried out in third and fourth stages in a manner similar to the molding stages illustrated in FIGS. 7 and 8.

It is also within the scope of this disclosure to mold gob 62 in stages in compression mold 110 after gob 62 is placed initially to lie substantially under mold plate 33. In this embodiment, the sequence of movement of plates 31, 32, 33 in direction 11 toward lower mold portion 38 is "reversed" as compared to the sequence disclosed in FIGS. 10–12. In connection with the discussion of this embodiment, reference to "stages" associated with plates 31, 32, 33 has been omitted. Thus, plate 33 is moved in direction 11 during a first stage, plate 32 is moved in direction 11 during a second stage, and plate 31 is moved in direction 11 during a third stage. Further molding of gob 62 during a fourth stage of the molding process to produce container closure 10 is carried out in the manner suggested in FIGS. 7 and 8.

Some embodiments contemplated by this disclosure may have only two mold plates in upper mold portion 37 which move relative to lower mold portion 38. In other embodiments, there may be four or more mold plates in upper mold portion 37 which move relative to lower mold portion 38.

Figure 14:
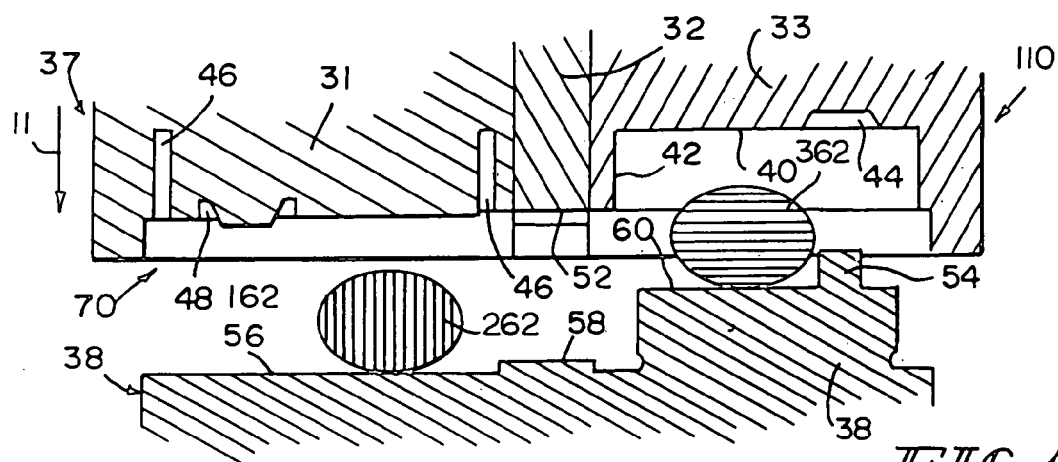
FIGS. 14–16 illustrate another molding sequence in accordance with the present disclosure wherein one gob having a first characteristic (e.g., a first color) is associated with one first-stage mold plate, another gob having a second characteristic (e.g., a second color) is associated with another first-stage mold plate, and the two gobs are merged and molded to create a monolithic container closure.
Figure 15:
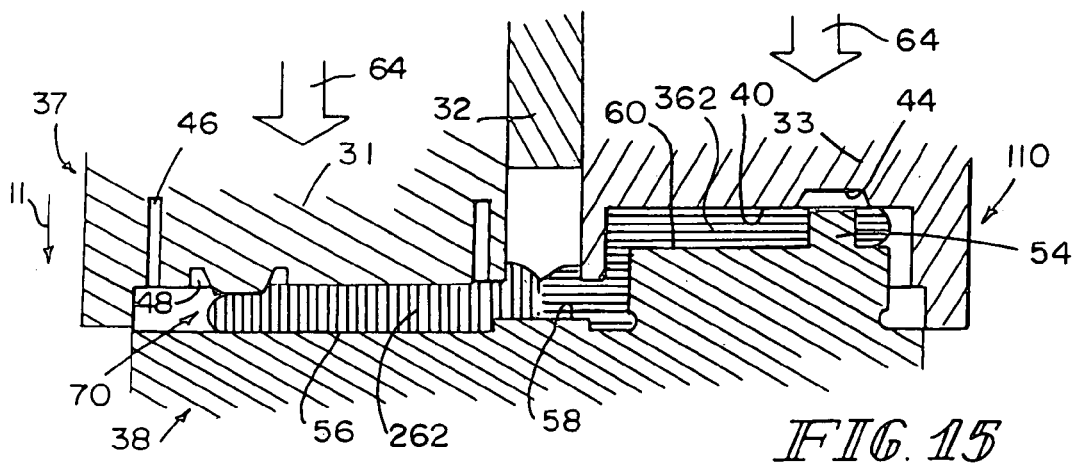
Figure 16:
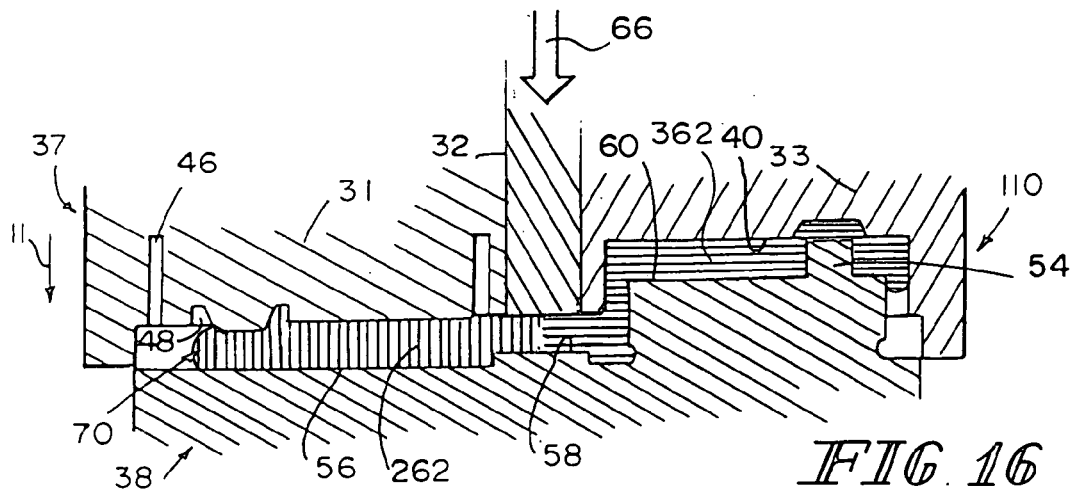

Yet another illustrative staged compression molding process is illustrated in FIGS. 14–16. As suggested in FIG. 14, a first gob 262 of thermoplastics material is arranged in one region of mold 110 substantially to lie under mold plate 31 while a second gob 362 of thermoplastics material is arranged in another region of mold 110 substantially to lie under mold plate 33. In one embodiment, first gob 262 has a first color (e.g., red) and second gob 362 has a second color (e.g., blue) different from the first color. In another embodiment, first gob 262 comprises a first thermoplastic material and second gob 362 comprises a second thermoplastic material different from the first thermoplastic material. It is within the scope of this disclosure to use a first gob 262 having selected material, color, or other property of interest and to use a second gob 362 having different selected materials, colors, or other properties of interest as long as the first and second gobs 262, 362 can be "merged" during the molding process to produce a monolithic container closure 10.

As suggested in FIG. 15, during the compression molding process, first gob 202 is compressed (at low pressure) by mold plate 31 while second gob 362 is compressed (at low pressure) by mold plate 33. Such compression causes gob 262, 362 to move toward and contact one another in a region in mold cavity 70 located, for example, under mold plate 32.

As suggested in FIG. 16, mold plate 32 is then moved to compress adjacent portions of gobs 262, 362 (at low pressure) to begin or continue merger of those gob portions in the mold region defining, for example, living hinge 18. Further molding of the material comprising gobs 262, 362 to produce container closure 10 is carried out in a third stage similar to the molding stage illustrated in FIG. 8 by compressing that material at high pressure using plates 31, 32, and 33.

The invention claimed is:

1. A process of molding a container closure in stages, the process comprising depositing a gob of thermoplastics material into a mold cavity located between spaced-apart upper and lower mold portions, moving at least a first-stage mold plate and a separate second-stage mold plate in sequence relative to the lower mold portion to compress the gob during two sequential stages of a molding process, the first-stage mold plate being moved relative to the lower mold portion to apply a low-pressure force to the gob during a first stage of the molding process, the second-stage mold plate being moved relative to the lower mold portion to apply a substantially similar low-pressure force to the gob during a subsequent second stage of the molding process, and moving the first- and second-stage mold plates in unison relative to the lower mold portion to apply a high-pressure force greater than the low-pressure force to the gob during a later stage of the molding process to form a monolithic container closure in the mold cavity between the upper and lower mold portions.

2. The process of claim 1, wherein all of the gob is placed under the first-stage mold plate before the first-stage mold plate is moved relative to the lower mold portion to begin to compress the gob.

3. The process of claim 2, wherein first, second, and third mold plates are moved toward the lower mold portion in sequence at different times to compress the gob therebetween during a first stage of the molding process associated with movement of the first-stage mold plate, a subsequent second stage of the molding process associated with movement of the second-stage mold plate, and a still later third stage of the molding process associated with movement of a third-stage mold plate.

4. The process of claim 3, wherein a substantially similar low-pressure force is applied to the gob during each of the first, second, and third stages of the molding process.

5. The process of claim 3, wherein the first, second, and third mold plates are moved toward the lower mold portion in unison further to compress the gob therebetween during a fourth stage of the molding process after completion of the first, second, and third stages of the molding process.

* * * * *